(12) United States Patent
Xu et al.

(10) Patent No.: US 10,243,306 B2
(45) Date of Patent: Mar. 26, 2019

(54) OUTPUT DEVICE INCLUDING DC TRANSMISSION CABLE AND CONNECTOR

(71) Applicant: Delta Electronics (Shanghai) Co., Ltd., Shanghai (CN)

(72) Inventors: Dao-Fei Xu, Shanghai (CN); Jin-Fa Zhang, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 1 day.

(21) Appl. No.: 15/007,168

(22) Filed: Jan. 26, 2016

(65) Prior Publication Data

US 2017/0063230 A1 Mar. 2, 2017

(30) Foreign Application Priority Data

Aug. 27, 2015 (CN) .......................... 2015 1 0535493

(51) Int. Cl.
*H02M 3/335* (2006.01)
*H01R 13/66* (2006.01)
*H01R 24/28* (2011.01)
*H02M 3/156* (2006.01)
*H02M 3/158* (2006.01)

(52) U.S. Cl.
CPC ......... *H01R 13/6675* (2013.01); *H01R 24/28* (2013.01); *H02M 3/156* (2013.01); *H02M 3/1582* (2013.01); *H02M 3/33507* (2013.01); *H02M 3/33523* (2013.01)

(58) Field of Classification Search
CPC ......... H02M 3/33523; H02M 3/33507; H02M 3/158
See application file for complete search history.

(56) References Cited

U.S. PATENT DOCUMENTS

| | | | |
|---|---|---|---|
| 6,590,597 B1 * | 7/2003 | Kim ........................ | G06F 21/30 345/211 |
| 2010/0202159 A1 * | 8/2010 | Sims ....................... | H02M 1/15 363/15 |
| 2011/0181251 A1 * | 7/2011 | Porter ...................... | G05F 5/00 323/222 |

(Continued)

FOREIGN PATENT DOCUMENTS

| CN | 1761139 A | 4/2006 |
|---|---|---|
| CN | 1904790 A | 1/2007 |

(Continued)

*Primary Examiner* — Jue Zhang
*Assistant Examiner* — Lakaisha Jackson
(74) *Attorney, Agent, or Firm* — CKC & Partners Co., Ltd.

(57) ABSTRACT

An output device is disclosed herein. The output device includes a DC transmission cable and a connector. The DC transmission cable is configured to receive and transmit a DC voltage. The connector is connected to an output terminal of the DC transmission cable and configured to receive the DC voltage and output an output voltage. The connector includes a housing, a DC-DC converter and a output terminal. The DC-DC converter is enclosed in the housing and configured to convert the DC voltage to the output voltage. The output terminal includes a first node and a second node, and the first node is connected to the DC-DC converter, enclosed in the housing and configured to receive and transmit the output voltage.

19 Claims, 3 Drawing Sheets

(56) References Cited

U.S. PATENT DOCUMENTS

| | | | | |
|---|---|---|---|---|
| 2012/0267955 | A1* | 10/2012 | Zhan | H02J 1/06 307/31 |
| 2013/0162226 | A1* | 6/2013 | Su | H02M 3/156 323/234 |
| 2015/0249354 | A1* | 9/2015 | Lim | H02J 7/0052 307/1 |
| 2015/0349650 | A1* | 12/2015 | Lee | G06F 1/26 363/21.12 |
| 2016/0087537 | A1* | 3/2016 | Barkley | H05B 33/0815 363/21.12 |

FOREIGN PATENT DOCUMENTS

| | | |
|---|---|---|
| CN | 101814763 A | 8/2010 |
| CN | 201726322 U | 1/2011 |
| CN | 102820765 A | 12/2012 |
| CN | 104779784 A | 7/2015 |
| TW | M415513 U | 11/2011 |
| TW | 201227204 A | 7/2012 |
| TW | M491233 U | 12/2014 |
| TW | 201524105 A | 6/2015 |
| TW | 201527937 A | 7/2015 |

* cited by examiner

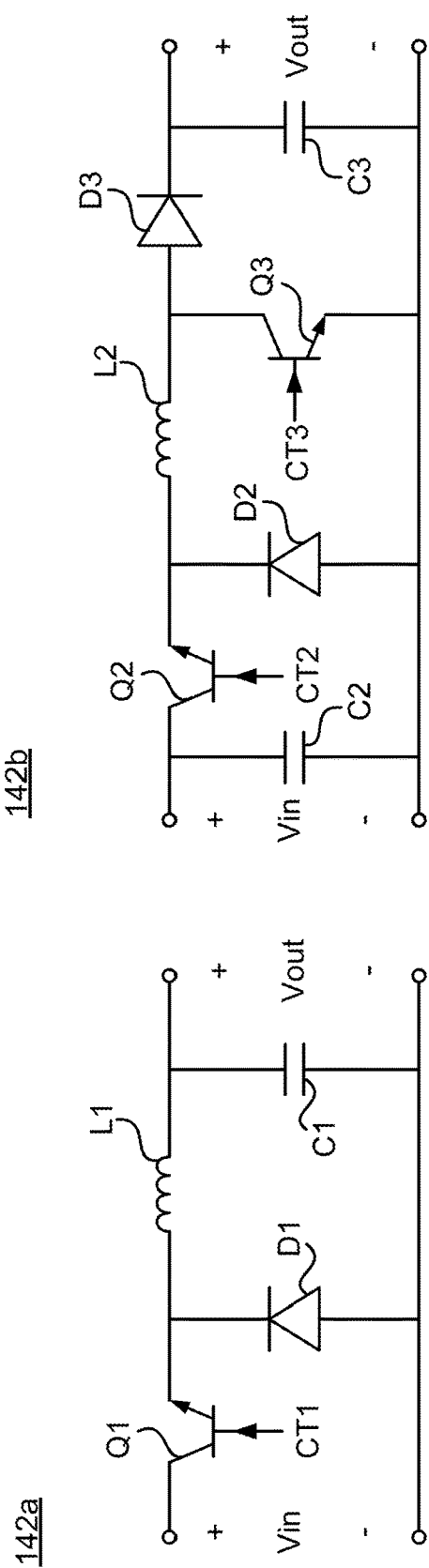

OUTPUT DEVICE INCLUDING DC TRANSMISSION CABLE AND CONNECTOR

RELATED APPLICATIONS

This application claims priority to Chinese Application Serial Number 201510535493.3, filed Aug. 27, 2015, which is herein incorporated by reference.

BACKGROUND

Technical Field

The present disclosure relates to an output device, and in particular, to an output device configured to supply power to an electronic device.

Description of Related Art

DC transmission cable is popularly used to transmit power to an electronic device, which always has a sufficient length for the convenience in use (e.g 1.8 meters for notebook PC adapter application in AC/DC power adapter system). Under such circumstance, the impedance of the DC transmission cable can't be neglectable and there is a voltage drop between two terminals of the DC transmission cable, which increases as the transmitted power increases. The power loss due to the impedance of the transmission cable results in lower efficiency, and the actual voltage supplied to the electronic device may be lower than expectation, and may cause malfunction of the device in some applications.

SUMMARY

One aspect of the present disclosure is an output device. The output device includes a DC transmission cable and a connector. The DC transmission cable is configured to receive and transmit a DC voltage. The connector is connected to an output terminal of the DC transmission cable and configured to receive the DC voltage and output an output voltage. The connector includes a housing, a DC-DC converter and an output terminal. The DC-DC converter is enclosed in the housing and configured to convert the DC voltage to the output voltage. The output terminal is enclosed in the housing and configured to transmit the output voltage It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiments, with reference made to the accompanying drawings as follows:

FIG. 2 is a schematic diagram illustrating a dc-dc converter according to an embodiment of the present disclosure;

FIG. 3 is a schematic diagram illustrating a dc-dc converter according to an embodiment of the present disclosure;

DETAILED DESCRIPTION

Figure 1:
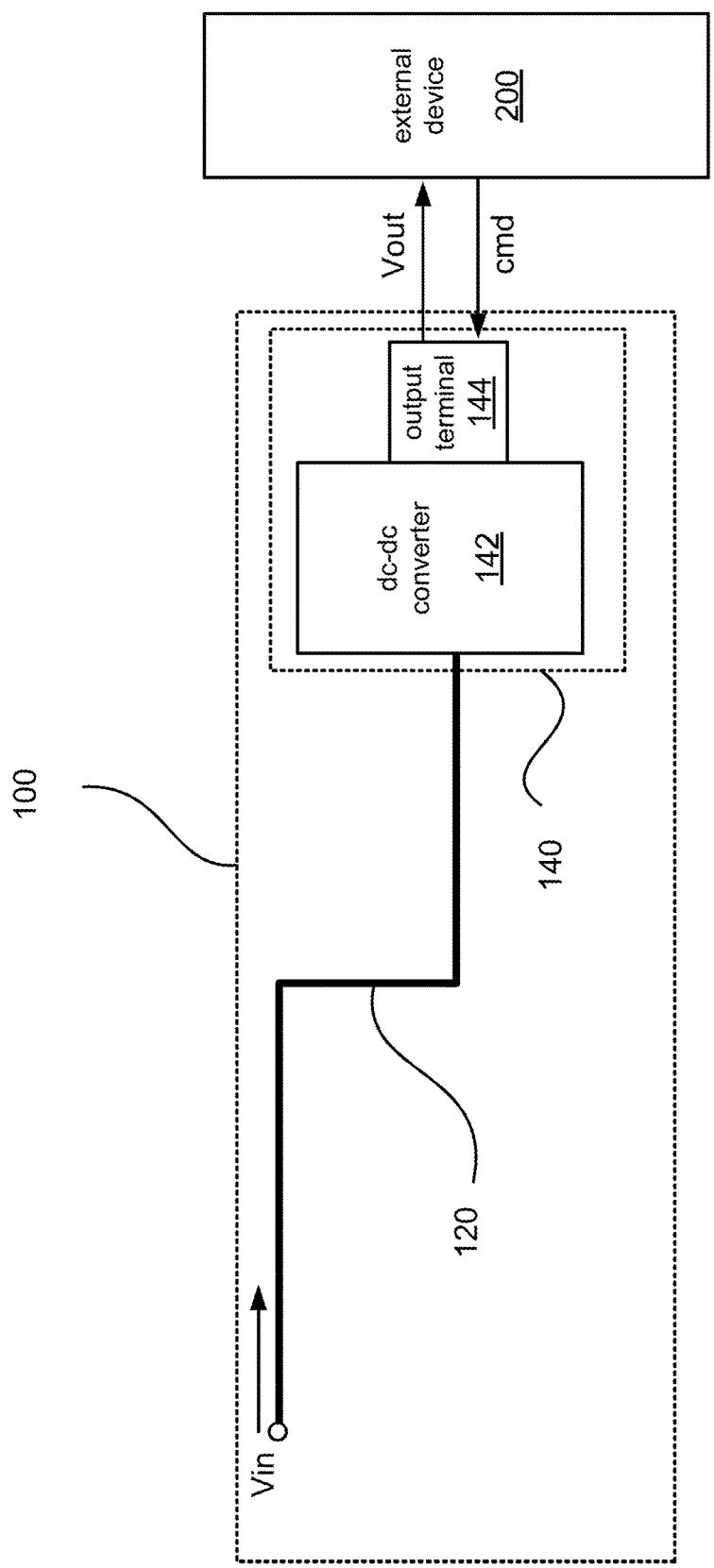
FIG. 1 is a schematic diagram illustrating an output device according to an embodiment of the present disclosure.

Reference will now be made in detail to embodiments of the present disclosure, examples of which are described herein and illustrated in the accompanying drawings. While the disclosure will be described in conjunction with embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. It is noted that, in accordance with the standard practice in the industry, the drawings are only used for understanding and are not drawn to scale. Hence, the drawings are not meant to limit the actual embodiments of the present disclosure. In fact, the dimensions of the various features may be arbitrarily increased or reduced for clarity of discussion. Wherever possible, the same reference numbers are used in the drawings and the description to refer to the same or like parts for better understanding.

The terms used in this specification and claims, unless otherwise stated, generally have their ordinary meanings in the art, within the context of the disclosure, and in the specific context where each term is used. Certain terms that are used to describe the disclosure are discussed below, or elsewhere in the specification, to provide additional guidance to the practitioner skilled in the art regarding the description of the disclosure.

The terms "about" and "approximately" in the disclosure are used as equivalents. Any numerals used in this disclosure with or without "about," "approximately," etc. are meant to cover any normal fluctuations appreciated by one of ordinary skill in the relevant art. In certain embodiments, the term "approximately" or "about" refers to a range of values that fall within 20%, 10%, 5%, or less in either direction (greater or less than) of the stated reference value unless otherwise stated or otherwise evident from the context.

In the following description and in the claims, the terms "include" and "comprise" are used in an open-ended fashion, and thus should be interpreted to mean "include, but not limited to." As used herein, the term "and/or" includes any and all combinations of one or more of the associated listed items.

In this document, the term "coupled" may also be termed "electrically coupled," and the term "connected" may be termed "electrically connected." "Coupled" and "connected" may also be used to indicate that two or more elements cooperate or interact with each other. It will be understood that, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments.

Reference is made to FIG. 1. FIG. 1 is a schematic diagram illustrating an output device 100 according to an embodiment of the present disclosure. As illustratively shown in FIG. 1, the output device 100 is configured to receive a dc voltage Vin, and output an output voltage Vout to supply power to the external device 200. The output device 100 includes a dc transmission cable 120 and a connector 140. In various embodiments of the present disclosure, the external device 200 may be a personal computer, a laptop, a tablet, other portable electronic device such as a smartphone, but not limited thereto.

Specifically, in some embodiment, the input terminal of the dc transmission cable 120 is configured to receive the dc voltage Vin from a power device, and transmit the dc voltage Vin to the connector 140. In some embodiments, the input terminal of the dc transmission cable 120 is a plug, and the plug is configured to plug-in connected to a plughole of the power device. The connector 140 is connected to an output terminal of the dc transmission cable 120 and configured to be connected to the external device 200. The connector 140 is configured to receive dc voltage Vin and output the output voltage Vout to supply power to the external device 200. In some embodiments, the level of the dc voltage Vin may be higher than the level of the output voltage Vout. For example, the dc voltage Vin may be any value between 5 volts to 60 volts, such as 5V, 10V, 30V, 40V, or 48V, but the present disclosure is not limited thereto. The output voltage Vout may be 5V, 12V, or 20V dc voltage, but not limited thereto. The voltage level of the input voltage Vin and the output voltage Vout may both be designed according to the actual needs. In addition, the length of the dc transmission cable 120 may be adjusted according to the actual needs. For example, in some embodiments, the length of the dc transmission cable 120 may be any value between about 0.5 m to 3 m, such as 0.5 m, 1.2 m, 1.6 m, 1.8 m, or 2.5 m, but not limited thereto.

Specifically, the connector 140 may include housing, a dc-dc converter 142 and an output terminal 144. The dc-dc converter 142 is configured to convert the dc voltage Vin to the output voltage Vout.

As illustratively shown in the figure, in the present embodiment, the dc-dc converter 142 and the output terminal 144 are enclosed in the housing. Specially, a first node of the output terminal 144 is connected to the dc-dc converter 142, and the first node of the output terminal 144 is enclosed in the housing such that the output terminal 144 and the dc-dc converter 142 are fixedly connected, and a second node of the output terminal may be configured to connect to an external device 200, thus the output terminal 144 may be configured to receive and transmit the output voltage Vout, such that the output device 100 may supply power to the external device 200 connected to the output device 100. In some embodiments, the output terminal 144 may be formed by a hard and conductive material. In some embodiments, the second node of the output terminal 144 is plug-in connected to the external device 200. For example, the external device 200 includes a plughole and the output terminal 144 plugs in the plughole. For example, in some embodiments, the output terminal 144 and the plughole may be a universal serial bus (USB) interface.

In one embodiment, in order to minimize the volume of the dc-dc converter 142, a high frequency (e.g., frequency around 1 MHz) design may be chosen. Thus, in one embodiment, the switches of the dc-dc converter 142 are implemented by semiconductor elements such as Si-MOSFETs. In another embodiment, the switches of the dc-dc converter 142 are implemented by novel semiconductor elements such as GaN HEMTs. And in one further embodiment, the switches of the dc-dc converter 142 are implemented by both Si-MOSFETs and GaN HEMTs.

In one embodiment, dc-dc converter 142 includes a synchronous rectifier unit to reach a higher conversion efficiency. In another embodiment, the synchronous rectifier unit is implemented by a GaN HEMT.

Thus, by transmitting the dc voltage Vin via the dc transmission cable 120 to the connector 140, and using the dc-dc converter 142 in the connector 140 to convert the dc voltage Vin to the output voltage Vout, the output voltage Vout is not affected by the actual voltage drop due to the power loss in the transmission cable. In addition, in some embodiments, if the voltage level of the dc voltage Vin is higher than the output voltage Vout, the transmission current through the transmission cable 120 is lower with same transmission power, so the power loss of the transmission cable 120 is decreased and the total power conversion efficiency is improved.

Thus, when the power supplies are equipped to provide dc voltage Vin at different places such as home, offices, or schools, the user may bring the portable output device 100 and connect the output device 100 to the local power supply providing dc voltage Vin to supply power to the external device 200, which is more convenient in use.

In some embodiments, the dc-dc converter 142 in the connector 140 may be configured to output the output voltage Vout according to a communication signal Cmd from the external device 200. Specifically, the communication signal Cmd may be a digital pulse signal or a voltage signal, a resistor signal, or any other suitable signal reflecting the state of the external device 200. Thus, the output terminal 144 is configured to transmit the communication signal Cmd, and the output device 100 may be able to receive and transmit the communication signal Cmd from the external device 200 via the output terminal 144 to the dc-dc converter 142 to output the output voltage Vout. In an embodiment, the output terminal 144 may also be able to transmit a communication signal Cmd from the dc-dc converter 142 to the external device 200 too, for example, inform the external device 200 the output capacity of the dc-dc converter 142 or to confirm whether dc-dc converter 142 had received the communication signal Cmd from the external device 200, or any other suitable signal outputted by the dc-dc converter 142.

For example, in the embodiment that the output terminal 144 of the connector 140 is connected to the external device 200 using the USB interface, the communication signal Cmd may be transmitted between the dc-dc converter 142 and the external device 200 using the voltage signal of the D+ pin and/or the D− pin to determine the voltage level desired by the external device 200, and then adjust the output voltage Vout correspondingly, but the present disclosure is not limited thereto. In some embodiments, other communication pin may be used to transmit the communication signal Cmd between the external device 200 and external device 200 to determine the voltage level desired by the external device 200, and then adjust the output voltage Vout correspondingly. For example, when the external device 200 is a tablet or a smartphone, the dc-dc converter 142 may control the connector 140 outputs 12V or 5V output voltage Vout according to the communication signal Cmd.

Thus, the output device 100 may directly adjust the output voltage Vout using the dc-dc converter 142 in order to meet the requirement of the external device 200. Alternatively stated, extra signal lines are not needed to be arranged in the dc transmission cable 120, and the dc transmission cable 120 may only include power transmission line to transmit the dc voltage Vin, and the design and manufacturing cost of the output device 100 is reduced.

It is noted that in some embodiments, the dc-dc converter 142 is an isolated power converting circuit. Specifically, the isolated power converting circuit may be a flyback converter, a forward converter, a half-bridge converter, a full bridge converter, or a push-pull converter. In some embodiments, the dc-dc converter 142 may be a non-isolated power converting circuit. Specifically, the non-isolated power converter circuit may be a buck converter, a boost converter, a buck-boost converter, etc.

Reference is made to FIG. 2. FIG. 2 is a schematic diagram illustrating a dc-dc converter 142a according to an embodiment of the present disclosure. In the present disclosure, the dc-dc converter 142a includes a switching unit Q1, a diode unit D1, a inductor unit L1 and a capacitor unit C1. The switching unit Q1 includes a first terminal, a second terminal and a control terminal, in which the first terminal is electrically coupled to the output terminal of the dc transmission cable 120 and configured to receive the dc voltage Vin. The diode unit D1 includes a first terminal (e.g., cathode) and a second terminal (e.g., anode). The first terminal of the diode unit D1 is electrically coupled to the second terminal of the switching unit Q1. The second terminal of the diode unit D1 is electrically coupled to a ground terminal. In one embodiment, the diode unit D1 can be implemented by synchronous rectifier unit. The inductor unit L1 includes a first terminal, and a second terminal. The first terminal of the inductor unit L1 is electrically coupled to the second terminal of the switching unit Q1. The second terminal of the inductor unit L1 is electrically coupled to the first node of the output terminal 144 and configured to output the output voltage Vout. The capacitor unit C1 includes a first terminal, and a second terminal. The first terminal of the capacitor unit C1 is electrically coupled to the second terminal of the inductor unit L1. The second terminal of the capacitor unit C1 is electrically coupled to the ground terminal.

In the present embodiment, the control terminal of the switching unit Q1 is configured to receive a control signal CT1 such that the switching unit Q1 is selectively turned on or off according to the control signal CT1, to adjust the output voltage Vout of the dc-dc converter 142a.

Thus, by proper control signal CT1 controlling the on and off of the switching unit Q1, the voltage level of the output voltage Vout outputted by the dc-dc converting unit 142a may be adjusted by the operation of the switching unit Q1, the diode unit D1, the inductor unit L1 and the capacitor unit C1. In some embodiments, the control signal CT1 may be generated according to the communication signal Cmd such that the output device 100 achieves the requirement of the external device 200 and adjusts the voltage level of the output voltage Vout according to the different communication signal Cmd. In some embodiments, the control signal CT1 may be a pulse width modulation (PWM) signal.

Reference is made to FIG. 3. FIG. 3 is a schematic diagram illustrating a dc-dc converter 142b according to another embodiment of the present disclosure. In the present disclosure, the dc-dc converter 142b includes switching units Q2 and Q3, diode units D2 and D3, inductor unit L2 and capacitor unit C2 and C3.

The switching unit Q2 includes a first terminal, a second terminal and a control terminal. The first terminal of the switching unit Q2 is electrically coupled to the output terminal of the dc transmission cable 120 and configured to receive the dc voltage Vin. The diode unit D2 includes a first terminal (e.g., cathode), and a second terminal (e.g., anode). The first terminal of the diode unit D2 is electrically coupled to the second terminal of the switching unit Q2. The second terminal of the diode unit D2 is electrically coupled to a ground terminal. The inductor unit L2 includes a first terminal, and a second terminal. The first terminal of the inductor unit L2 is electrically coupled to the second terminal of the switching unit Q2. The switching unit Q3 includes a first terminal, a second terminal, and a control terminal. The first terminal of the switching unit Q3 is electrically coupled to the second terminal of the inductor unit L2. The second terminal of the switching unit Q3 is electrically coupled to the ground terminal. The diode unit D3 includes a first terminal, and a second terminal. The first terminal of the diode unit D3 is electrically coupled to the second terminal of the inductor unit L2. The second terminal of the diode unit D3 is electrically coupled to first node of the output terminal 144 and configured to output the output voltage Vout. In one embodiment, the diode unit D2 and D3 can be implemented by synchronous rectifier unit. The capacitor unit C2 includes a first terminal, and a second terminal. The first terminal of the capacitor unit C2 is electrically coupled to the first terminal of the switching unit Q2. The second terminal of the capacitor unit C2 is electrically coupled to the ground terminal. The capacitor unit C3 includes a first terminal, and a second terminal. The first terminal of the capacitor unit C3 is electrically coupled to the second terminal of the diode unit D3. The second terminal of the capacitor unit C3 is electrically coupled to the ground terminal.

Similar to the embodiment shown in FIG. 2, in the present embodiment, the control terminal of the switching unit Q2 and of the switching unit Q3 are configured to receive control signals CT2 and CT3 respectively, such that the switching unit Q2 and Q3 are selectively turned on or off according to the control signals CT2 and CT3 respectively, to adjust the output voltage Vout of the dc-dc converter 142b.

Thus, by proper control signals CT2 and CT3 controlling the on and off of the switching units Q2 and Q3, the voltage level of the output voltage Vout outputted by the dc-dc converting unit 142b may be adjusted by the operation of the switching units Q2 and Q3, the diode units D2 and D3, the inductor unit L2 and the capacitor units C2 and C3. In some embodiments, the control signals CT2 and CT3 may be generated according to the communication signal Cmd such that the output device 100 achieves the requirement of the external device 200 and adjusts the voltage level of the output voltage Vout according to the different communication signal Cmd. In some embodiments, the control signal CT2 and CT3 may be a pulse width modulation (PWM) signal.

Figure 4:
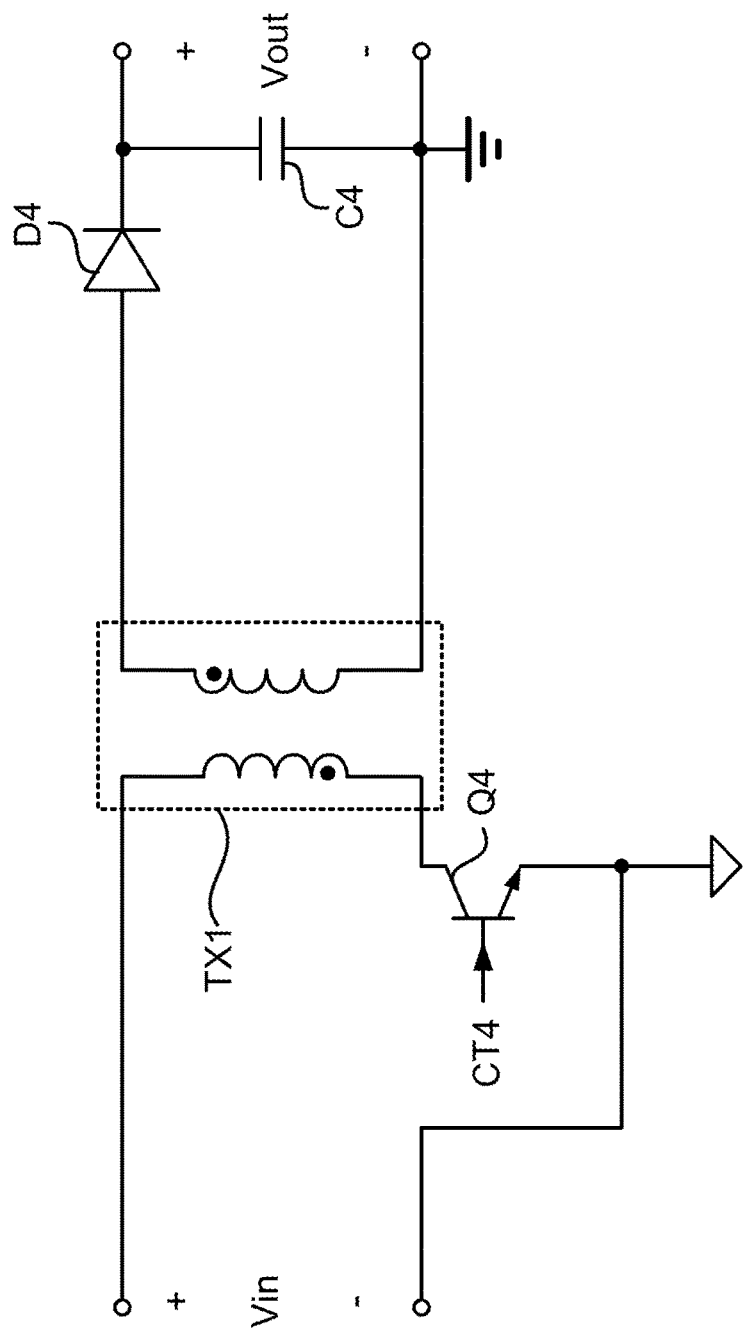
FIG. 4 is a schematic diagram illustrating a dc-dc converter according to an embodiment of the present disclosure.

Reference is made to FIG. 4. FIG. 4 is a schematic diagram illustrating a dc-dc converter 142c according to another embodiment of the present disclosure. In the present disclosure, the dc-dc converter 142c includes a transformer TX1, a switching unit Q4, a diode unit D4, and a capacitor unit C4. The primary winding of the transformer TX1 is electrically coupled to the output terminal of the dc transmission cable 120 and configured to receive the dc voltage Vin. The switching unit Q4 includes a first terminal, a second terminal, and a control terminal. The first terminal of the switching unit Q4 is electrically coupled to the primary winding of the transformer TX1. The second terminal of the switching unit Q4 is electrically coupled to a primary side ground. The diode unit D4 includes a first terminal (e.g., anode) and a second terminal (e.g., cathode). The first terminal of the diode unit D4 is electrically coupled to the secondary winding of the transformer. The second terminal of the diode unit D4 is electrically coupled to the first node of the output terminal 144 and configured to output the output voltage Vout. In one embodiment, the diode unit D4 can be implemented by synchronous rectifier unit. The capacitor unit C4 includes a first terminal and a second terminal. The first terminal of the capacitor unit C4 is electrically coupled to the second terminal of the diode unit D4. The second terminal of the capacitor unit C4 is electrically coupled to a secondary side ground.

In the present embodiment, the control terminal of the switching unit Q4 is configured to receive a control signal CT4 such that the switching unit Q4 is selectively turned on or off according to the control signal CT4, to adjust the output voltage Vout of the dc-dc converter 142c.

Thus, by proper control signal CT4 controlling the on and off of the switching unit Q4, the voltage level of the output voltage Vout outputted by the dc-dc converting unit 142c may be adjusted by the operation of the switching unit Q4, the diode unit D4, the transformer TX1 and the capacitor unit C4. In some embodiments, the control signal CT4 may be generated according to the communication signal Cmd such that the output device 100 achieves the requirement of the external device 200 and adjusts the voltage level of the output voltage Vout according to the different communication signal Cmd to adjust the voltage level of the output voltage Vout. For example, the control signal CT4 may be a pulse width modulation (PWM) signal.

It is noted that the switching unit Q1~Q4, the diode unit D1~D4, the capacitor unit C1~C4, the inductor unit L1 and L2 in the above embodiments may be implemented in various way. For example, the switching unit Q1~Q4 may be implemented by Bipolar Junction Transistor (BJT), Metal-Oxide-Semiconductor Field-Effect Transistor (MOSFET) (for example, GaN HEMT and/or a Si-MOSFET) or other proper semiconductor elements. The diode unit D1-D4 may be implemented by synchronous rectifier unit. In one embodiment, the synchronous rectifier unit may be implemented by a GaN HEMT.

In the present disclosure, by applying the various embodiments discussed above, integrating the dc-dc converter 142 into the connector 140 such that the dc voltage Vin is converted to the output voltage Vout by the dc-dc converter 142 in the connector 140, the voltage level Vout can be stable and accurate. In addition, the signal lines in the dc transmission cables 120 are not needed and thus reducing the manufacturing cost and the diameter of the transmission cables. Furthermore, in some embodiments, using the output device 100 in the present disclosure may reduce the power loss in the output device 100 and the overall conversion efficiency is improved.

Although the disclosure has been described in considerable detail with reference to certain embodiments thereof, it will be understood that the embodiments are not intended to limit the disclosure. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An output device comprising:
    a dc transmission cable configured to receive and transmit a dc voltage, wherein the dc voltage is between 5 volts to 60 volts; and
    a connector connected to an output terminal of the dc transmission cable and configured to receive the dc voltage and output an output voltage, wherein the connector comprises:
    a housing;
    a dc-dc converter enclosed in the housing and configured to convert the dc voltage to the output voltage; and
    an output terminal enclosed in the housing and configured to transmit the output voltage;
    wherein the output terminal is further connected to an external device, and the output terminal is configured to transmit a communication signal from the external device to the DC-DC converter while transmitting the output voltage to the external device, the communication signal reflects the state of the external device, and the dc-dc converter is configured to adjust a voltage level of the output voltage correspondingly according to the communication signal.

2. The output device of claim 1, wherein the output terminal is a universal serial bus.

3. The output device of claim 1, wherein the dc-dc converter is configured to output the output voltage according to the communication signal from the external device.

4. The output device of claim 1, wherein the dc transmission cable only comprises power transmission line configured to transmit the dc voltage.

5. The output device of claim 1, wherein the dc transmission cable comprises an input terminal, and the input terminal receives the dc voltage from a power device.

6. The output device of claim 1, wherein the dc-dc converter is an isolated power converting circuit.

7. The output device of claim 6, wherein the isolated power converting circuit comprises a flyback power converter.

8. The output device of claim 1, wherein the dc-dc converter is a non-isolated power converting circuit.

9. The output device of claim 8, wherein the non-isolated power converting circuit comprises a non-isolated buck-boost power converting circuit.

10. The output device of claim 8, wherein the non-isolated power converting circuit comprises a non-isolated buck power converting circuit.

11. The output device of claim 1, wherein the dc-dc converter comprises at least one of a GaN HEMT and a Si-MOSFET.

12. The output device of claim 1, wherein the dc-dc converter comprises a synchronous rectifier unit.

13. The output device of claim 12, wherein the synchronous rectifier unit is implemented by a GaN HEMT.

14. The output device of claim 1, wherein the dc-dc converter comprises:
    a switching unit comprising:
    a first terminal electrically coupled to the output terminal of the dc transmission cable;
    a second terminal; and
    a control terminal;
    a synchronous rectifier unit comprising:
    a first terminal electrically coupled to the second terminal of the switching unit; and
    a second terminal electrically coupled to a ground terminal;
    an inductor unit comprising:
    a first terminal electrically coupled to the second terminal of the switching unit; and
    a second terminal electrically coupled to a first node of the output terminal; and
    a capacitor unit comprising:
    a first terminal electrically coupled to the second terminal of the inductor unit; and
    a second terminal electrically coupled to the ground terminal.

15. The output device of claim 14, wherein the control terminal of the switching unit is configured to receive a control signal such that the switching unit is selectively turned on or off according to the control signal, to adjust the output voltage of the dc-dc converter, wherein the control signal is generated according to the communication signal.

16. The output device of claim 1, wherein the dc-dc converter comprises:
    a first switching unit comprising:
    a first terminal electrically coupled to the output terminal of the dc transmission cable;
    a second terminal; and a control terminal;
a first synchronous rectifier comprising:
a first terminal electrically coupled to the second terminal of the first switching unit; and
a second terminal electrically coupled to a ground terminal;
an inductor unit comprising:
a first terminal electrically coupled to the second terminal of the first switching unit; and
a second terminal; and
a second switching unit comprising:
a first terminal electrically coupled to the second terminal of the inductor unit;
a second terminal electrically coupled to the ground terminal; and
a control terminal;
a second synchronous rectifier unit comprising:
a first terminal electrically coupled to the second terminal of the inductor unit; and
a second terminal electrically coupled to a first node of the output terminal;
a first capacitor unit comprising:
a first terminal electrically coupled to the first terminal of the first switching unit; and
a second terminal electrically coupled to the ground terminal; and
a second capacitor unit comprising:
a first terminal electrically coupled to the second terminal of the second synchronous rectifier unit; and
a second terminal electrically coupled to the ground terminal.

17. The output device of claim 16, wherein the control terminal of the first switching unit and of the second switching unit are configured to receive a first control signal and a second control signal respectively, such that the first switching unit and the second switching unit are selectively turned on or off according to the first control signal and the second control signal respectively, to adjust the output voltage of the dc-dc converter, wherein the first control signal and the second control signal are generated according to the communication signal.

18. The output device of claim 1, wherein the dc-dc converter comprises:
a transformer comprising:
a primary winding electrically coupled to the output terminal of the dc transmission cable; and
a secondary winding;
a switching unit comprising:
a first terminal electrically coupled to the primary winding of the transformer;
a second terminal electrically coupled to a primary side ground; and
a control terminal;
a synchronous rectifier unit comprising:
a first terminal electrically coupled to the secondary winding of the transformer;
a second terminal electrically coupled to a first node of the output terminal; and
a capacitor unit comprising:
a first terminal electrically coupled to the second terminal of the synchronous rectifier unit; and
a second terminal electrically coupled to a secondary side ground .

19. The output device of claim 18, wherein the control terminal of the switching unit is configured to receive a control signal such that the switching unit is selectively turned on or off according to the control signal, to adjust the output voltage of the dc-dc converter, wherein the control signal is generated according to the communication signal.

* * * * *